United States Patent Office  3,631,189
Patented Dec. 28, 1971

3,631,189
**SALTS CONTAINING 2-p-DIOXANONE AND
METHOD OF PREPARING SAME**
Thomas C. Snapp and Alden E. Blood, Longview, Tex.,
assignors to Eastman Kodak Company, Rochester, N.Y.
No Drawing. Filed Apr. 1, 1970, Ser. No. 24,878
Int. Cl. C07f *13/00, 15/04, 3/00*
U.S. Cl. 260—429 R    6 Claims

ABSTRACT OF THE DISCLOSURE

This invention relates to salts derived from 2-p-dioxanone which have the formula

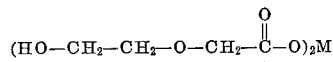

wherein M is a divalent inorganic cation, e.g. calcium or copper. These salts have unexpectedly been found to function as useful stabilizers for plastic compositions such as halogen-containing resins, e.g. polyvinyl chloride.

---

This invention relates to new and useful salts derived from 2-p-dioxanone. The invention also relates to a process for preparing these salts. Also disclosed is the use of these salts as stabilizers for plastic compositions. Other uses for these salts are also disclosed.

Considerable research and development activity has previously been carried out to discover new and useful stabilizers for plastic compositions, especially vinyl resins and halogen-containing resins such as vinyl halide resins, in order to stabilize these plastic compositions against heat and light degradation. Such degradation is evidenced by considerable discoloration. The instability of these plastics has been overcome in the art by adding to them certain chemical materials, hereinabove described as stabilizers. Examples of various prior art stabilizers developed for plastic compositions are noted in U.S. Pat. 2,624,716 which describes an alkaline earth ricinoleate stabilizer; Canadian Pat. No. 667,840 which describes a stabilizer comprising a tin compound and non-tin containing sulfur compound; U.S. Pat. 3,376,256 which discloses a stabilizer comprising a salt of tetravalent tin and other metals such as zinc, calcium, and barium; and U.S. Pat. 3,379,679 which describes a stabilizer comprising an organotin maleate.

An object of the present invention is to develop a new salt stabilizer for plastic compositions derived from 2-p-dioxanone.

Another object of the invention is to develop a process for preparing such salts.

A further object of the invention is to develop stabilized plastic compositions of matter containing said salt stabilizers.

These and other objects of the invention will become apparent from the following disclosure.

According to the present invention there has been developed a salt having a formula:

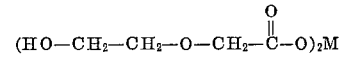

wherein M is a divalent inorganic cation. This salt is prepared by a process which comprises mixing together in an aqueous medium an inorganic carbonate having the formula MCO₃ and 2-p-dioxanone. The probable reaction sequence for the preparation of these salts can be illustrated as follows:

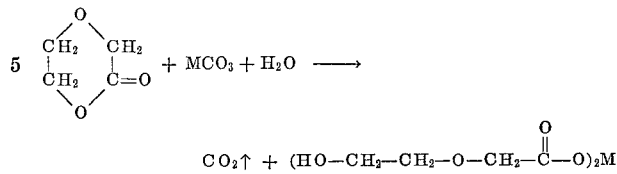

It will be observed that the salts of the present invention are derived from 2-p-dioxanone. This in itself illustrates the unobvious, unexpected nature of the present invention. That is, the salts of the present invention which can be described as hydroxylated ether salts would normally be expected to be unstable when subjected to various heat and light testing procedures. This is due to the fact that addition products of 2-p-dioxanone and related organic materials are generally characterized by their tendency to revert to the 2-p-dioxanone when subjected to heat. For example, the lactone homopolymer of 2-p-dioxanone can be decomposed by heat to yield monomeric 2-p-dioxanone. Further, the addition product of 2-p-dioxanone and methanol yields methyl β-hydroxyethoxyacetate, which can be thermally reversed to the alcohol and lactone. However, quite surprisingly it has been observed that the salts of the present invention which are derived from 2-p-dioxanone will not undergo this reversible reaction, thereby affording a material having excellent stability properties.

In the salt product and process of the present invention, a number of inorganic carbonates can be utilized. For example, good results have been obtained using magnesium carbonate, nickel carbonate, cupric carbonate, manganese carbonate, lead carbonate, cadmium carbonate, calcium carbonate, and barium carbonate. As a group, metal carbonates are particularly useful. Illustrative of these metal carbonates are carbonates containing divalent alkaline earth metals, metals selected from the group consisting of tin, lead, cadmium and magnesium, and also divalent metals comprising the first "transition series," i.e. manganese, iron, cobalt, nickel, copper, and zinc.

The 2-p-dioxanone utilized to prepare the product of the present invention is a well known material and may be prepared by a number of methods. A preferred method is by the dehydrogenation of diethylene glycol. One particularly useful method for the synthesis of 2-p-dioxanone is disclosed in copending U.S. patent application Ser. No. 45,465, filed June 17, 1970. The inorganic carbonates useful in the present invention have been described hereinabove and of course are well known in the art. Accordingly, further description of these materials is deemed unnecessary.

The preparation of the salts of the present invention is advantageously carried out in aqueous media. To the aqueous media is added one mole of the carbonate for each two or more moles of 2-p-dioxanone. Evolution of carbon dioxide may be observed upon addition of the lactone. To insure substantially complete reaction of the 2-p-dioxanone, one may add a molar excess of the carbonate. However, a preferred ratio of carbonate to 2-p-dioxanone is approximately one mole of carbonate for each two moles of 2-p-dioxanone. Of course, it will be recognized that differing ratios of carbonate to 2-p-dioxanone may be used depending upon the particular carbonate utilized.

The process described above for preparing the salt of the present invention may be carried out at a temperature of from about 25 to about 100° C. and at from about 1 to about 10 atmospheres pressure. Higher or lower temperatures and pressures may be also utilized, but are unnecessary. Temperature ranges of from about 60 to about 90° C. and atmospheric pressure represent the preferred reaction conditions. In addition to the surprising stability of the salt products of the present invention, a further characteristic of these salts is their unusual solubility properties. These salts are extremely water soluble but exhibit poor solubility in common organic solvents as illustrated by the following Table I.

TABLE I

Solubility of metal hydroxy acid salts (in grams/100 grams of solvent) having the formula $$(HO-CH_2-CH_2-O-CH_2-\overset{O}{\underset{\|}{C}}-O)_2M$$

| M | Solvent | | | | | |
|---|---------|---|---|---|---|---|
|   | Toluene | DMF* | n-Butanol | Methanol | Acetone | Water |
| Mg | 0.008 | 0.057 | 0.017 | 4.323 | 0.017 | 63.601 |
| Ni | 0.127 | 31.759 | 1.207 | 35.137 | 0.006 | 87.220 |
| Ca | 0.012 | 0.003 | 0.057 | 5.004 | 0.021 | 89.394 |
| Cu | 0.180 | 0.265 | 0.130 | 2.127 | 0.004 | 16.133 |
| Zn | 0.008 | 0.246 | 0.035 | 0.941 | 0.009 | 1.519 |
| Pb | 0.001 | 0.494 | 0.215 | 0.415 | 0.036 | 19.903 |

*Dimethylformamide.

These unusual solubility properties render the products of this invention useful in many applications. These solubility properties are unusual in that one skilled in the art would expect good solubility of these salts in organic polar solvents such as alcohols, ketones, and dimethylformamide because of the presence of the two hydroxyl and ether functions in the salt molecule.

Among the various plastic resin compositions for which the salts of the present invention function as an excellent stabilizer, the vinyl resins and halogen-containing resins such as vinyl halide resin are among those having the greatest commercial significance. Examples of the various resins contemplated for use with the stabilizer of the present invention include those containing a plurality of vinyl chloride units such as polymers of vinyl chloride and conjoint polymers of vinyl chloride with another polymerizable compound, for example, copolymers of vinyl chloride with esters of acrylic and methacrylic acids, and with acrylonitrile; copolymers of vinyl chloride with vinyl esters of aliphatic acids, particularly vinyl acetate; copolymers of vinyl chloride with diene compounds and unsaturated dicarboxylic acids or their anhydrides, such as copolymers of vinyl chloride with diethyl maleate, diethyl fumarate, or maleic anhydride; after-chlorinated polymers and copolymers of vinyl chloride; copolymers of vinyl chloride and vinylidene chloride with unsaturated aldehydes, ketones and others, such as acrolein, crotonaldehyde, methyl vinyl ketone, methyl vinyl ether, isobutyl vinyl ether, and the like; polymers of vinylidene chloride and copolymers of the same with vinyl chloride and other polymerizable compounds; polymers of vinyl chloroacetate and dichlorodivinyl ether; chlorinated polymers of vinyl acetate; chlorinated polymer esters of acrylic and alpha-substituted acrylic acids; polymers of chlorinated styrenes, for example, dichlorostyrene; chlorinated rubber; chlorinated polymers of ethylene; polymers and after-chlorinated polymers of chlorobutadienes and their copolymers with vinyl chloride, rubber hydrochloride and chlorinated rubber hydrochloride; and mixtures of the polymers recited herein with each other or other polymerizable compounds. The corresponding bromides and fluorides lend themselves equally well to the preparation of the valuable new plastic compositions according to the present invention.

When utilizing the salts of the present invention as stabilizers for any of the above enumerated plastic materials, it is advantageous to utilize an amount of stabilizer equal to about 0.5 to about 10 parts by weight of the total plastic composition.

The following examples are given by way of illustration and are not to be construed as limitations of this invention, many variations of which are possible without departing from the spirit and scope thereof.

EXAMPLES I–VII

In these examples, there is illustrated various salts which can be derived from the 2-p-dioxanone according to the present invention. In each of these examples, a 2-liter, 3-neck flask fitted with a dropping funnel, stirrer and condenser is utilized. In each case 600 ml. of water and approximately 1 mole of the inorganic carbonate are added to the flask. To this stirred, refluxing mixture is added approximately 2 moles of 2-p-dioxanone by drop-wise addition. Evolution of carbon dioxide is immediately observed upon addition of 2-p-dioxanone. After addition of the lactone is complete, the resulting aqueous media is refluxed for about 2 to about 4 hours to insure complete reaction of the lactone and the carbonate. Removal of the water by vacuum distillation resulted in the production of the salts of the present invention. Table II illustrates the metal carbonate reactant utilized, color of the resultant salt, percent yield of the salt, and the melting point of the salt produced in each case.

TABLE II

| Example No. | Metal carbonate | Color of salt product | Percent yield | Melting point of salt product, ° C. |
|---|---|---|---|---|
| I | MgCO₃ | White | 85 | >300 |
| II | NiCO₃ | Green | 95 | 198–199 |
| III | CuCO₃ | ----do---- | 100 | 93–95 |
| IV | MnCO₃ | Pink | 92 | 139–140 |
| V | PbCO₃ | White | 99 | 138–139 |
| VI | CdCO₃ | ----do---- | 92 | 92–94 |
| VII | BaCO₃ | ----do---- | 94 | 215–217 |

EXAMPLES VIII–XV

The following examples demonstrate the use and effectiveness of the salts of the present invention as stabilizers for plastic compositions. In these examples, the plasic resin composition comprises a halogen-containing vinyl resin of polyvinyl chloride. The polyvinyl chloride resin consists of a mixture of 100 parts of a polyvinyl chloride resin sold by British Geon, Ltd., under the trade name Geon 101EP, 50 parts of the plasticizer di-2-ethylhexylphthalate and 3 parts of a salt of the present invention as the stabilizer. In each example a plastic resin and stabilizer mixture is compounded on a two-roll mill for about 4 minutes at approximately 300° F. After compounding, these formulations are pressed polished at about 325° F. to a thickness of 70 mils.

To illustrate the effectiveness of the compound of the present invention as stabilizers for plastic compositions, a comparison with a conventional stabilizer, noted in Table III as Ferro 1234 (a barium-cadmium-zinc salt of an organic acid) currently used in polyvinyl chloride resin (Commercial Standard), is provided as Example IX in Table III. To obtain heat stability data for the various stabilizer-resin compositions tested, 0.5 inch x 1 inch samples from each of the 70 mil sheets are placed in a 350° F. oven and removed every 15 minutes for 2 hours. Color evaluation of these formulations is conducted with the following color scales being used: 0 indicates clear, no color; 1 indicates very slight color; 2 indicates slight color; 3 indicates dark color; and 4 indicates black. Color ratings for these various samples are listed in Table III below. Of course, a very dark color rating indicates extensive degradation of the plastic composition which in turn indicates an ineffective stabilizer is being utilized.

To obtain light stability data, samples of the stabilizer-plastic composition are subjected to ultraviolet exposure by ASTM Method D–795. The samples are graded after 100, 300, and 600 hours exposure by the same color scale described above for the heat stability test. The ratings are given in Table III.

TABLE III.—COLOR, AFTER HEAT AGING, AND ULTRAVIOLET EXPOSURE

| Example No. | Stabilizer | Initial color | Heat stability | | | Ultraviolet exposure | | |
|---|---|---|---|---|---|---|---|---|
| | | | 30 min. | 60 min. | 90 min. | 100 hr. | 300 hr. | 600 hr. |
| VIII | Ferro 1234 | 1 | 2 | 2 | 3 | 1 | 1 | 1 |
| IX | Lead salt | 2 | 2 | 2 | 2 | 1 | 1 | 2 |
| X | Cadmium salt | 0 | 2 | 2 | 2 | 0 | 0 | 2 |
| XI | Barium salt | 2 | 2 | 2 | 3 | 1 | 1 | 2 |
| XII | Magnesium salt | 1 | 3 | 3 | 4 | 1 | 1 | 2 |
| XIII | Manganese salt | 2 | 3 | 3 | 4 | 1 | 1 | 2 |
| XIV | Nickel salt | 1 | 3 | 3 | 3 | 1 | 1 | 2 |
| XV | Calcium salt | 2 | 3 | 3 | 3 | 1 | 2 | 3 |

Similar results to those shown in Table III can be expected using different ratios of stabilizer to plastic resin material as disclosed earlier hereinabove. Of course, the optimum ratio of stabilizer to plastic resin material will vary somewhat depending in part upon the particular stabilizer utilized and the particular plastic resin to be stabilized.

The invention has been described in detail with particular reference to preferred embodiments thereof, but it will be understood that variations and modifications can be effected within the spirit and scope of the invention as described hereinabove and as defined in the appended claims.

We claim:
1. A salt having the formula

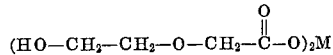

wherein M is a divalent inorganic cation selected from the group consisting of magnesium, nickel, cobalt, copper, manganese, lead, cadmium, tin, iron, zinc, calcium, strontium, and barium.

2. A process for the preparation of a salt having the formula

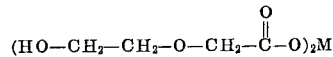

wherein M is a divalent inorganic cation which comprises mixing together in an aqueous media a carbonate having the formula $MCO_3$ and 2-p-dioxanone.

3. A process according to claim 2 wherein at least one mole of the carbonate is utilized for each two moles of 2-p-dioxanone.

4. A process according to claim 3 wherein the divalent inorganic cation is selected from the group consisting of magnesium, nickel, cobalt, copper, manganese, lead, cadmium, calcium, and barium.

5. A process according to claim 2 wherein the temperature of reaction is maintained between about 25 and 100° C.

6. A process according to claim 5 wherein the pressure of the reaction is between about 1 and 10 atmospheres.

References Cited

UNITED STATES PATENTS 3,280,065   10/1966   Langner _____ 260—29.7

TOBIAS E. LEVOW, Primary Examiner

A. P. DEMERS, Assistant Examiner

U.S. Cl. X.R.

260—45.75 R, 45.75 C, 45.75 K, 45.75 N, 45.85, 429.7, 429.9, 435 R, 438.1, 439 R, 535 R